Figure 1:

S. BENKÖ.
METHOD OF SECURING METAL CONTACTS TO CARBON ELECTRODES.
APPLICATION FILED JULY 8, 1909.

942,704.

Patented Dec. 7, 1909.

Witnesses

Inventor
Stephan Benkö
By Wm. E. Boulter
Attorney

UNITED STATES PATENT OFFICE.

STEPHAN BENKÖ, OF BUDAPEST, AUSTRIA-HUNGARY.

METHOD OF SECURING METAL CONTACTS TO CARBON ELECTRODES.

942,704.  Specification of Letters Patent.  Patented Dec. 7, 1909.

Application filed July 8, 1909. Serial No. 506,610.

*To all whom it may concern:*

Be it known that I, STEPHAN BENKÖ, a subject of the King of Hungary, residing at Budapest, in Austria-Hungary, have invented a certain new and useful Improved Method of Securing Metal Contacts to Carbon Electrodes, of which the following is a specification.

The most suitable negative electrode for obtaining a strong current in the case of galvanic elements is, as is well known, the carbon electrode first used by Bunsen. All elements provided with carbon electrodes have, however, the essential disadvantage that there is produced a considerable internal (terminal) resistance between the metal pole mounted on the head portion of the carbon and used for transmitting the current and the carbon, so that there is a not unimportant loss of energy. This is more particularly the case in elements in which, for the purpose of increasing the strength of current and obtaining a constant current, the acting electrolyte or single gases with depolarizing action are carried through the wall of the carbon body, as is the case for instance in the subject of the co-pending application Serial No. 473,047. In these elements there is produced a constant and very considerable quantity of current which, more particularly in large elements, cannot be carried away by means of ordinary binding screw terminals or the like, without a considerable loss of energy and moreover a considerable heating can be observed on such terminals. In the above mentioned carbon electrodes care must be therefore taken not only to enable the great quantity of current produced to be carried away from the generating electrode, but also to cause the depolarizing gas or the electrolyte to penetrate into all the pores for the purpose of obtaining a constant current. This can, however, be done in a reliable manner only when the opening of the carbon recess or hollow is closed in a complete, that is to say air- and liquid-tight manner, as otherwise a great portion of the gaseous or liquid substance gets lost owing to incomplete joint or instead of passing into the pores, escapes through the incomplete joint.

In order to get a better contact between the carbon and the contact metal, it has already been suggested to melt the contact metal and to dip the carbon into the same. It was in that case necessary, more particularly when using lead as contact metal, to close the pores of the carbon by means of paraffin, in order to prevent the electrolyte from getting between the carbon and the metal, and in the case of, say, lead and an electrolyte containing sulfuric acid, being used, to avoid formation of sulfate of lead. Moreover, in all well known processes only a superficial contact is produced between carbon and metal, which is not sufficient either for forming a tight joint or for avoiding the above mentioned drawbacks.

According to this invention, the carbon is impregnated at the head portion which is to be provided with metal contact, with a metal which cannot be decomposed by the electrolyte. The metal is incorporated with the carbon by suction or by forcing it in in a liquid state.

In carrying out the process in practice, the carbon is, for instance, heated to a point above the melting point of the contact metal before dipping it into the latter. In that way air is expelled from the pores of the carbon and the pores deprived of air, get filled with the contact metal on being dipped into it. On solidifying, the contact metal penetrates into the pores and completely fills them up, so that no electrolyte can pass between the carbon and the metal. A formation of sulfate of lead if lead is used can therefore take place only within the pores, where however it is harmless. The result is that the contact itself can be formed by a metal which is decomposed by the electrolyte as the decomposition takes place only in the pores where it is harmless.

In order to compress the porous contact metal after casting, and to insure its adhesion to the carbon, the end of the carbon provided with the contact, is placed under a very high pressure, the lateral walls of the mold being obliged to yield to the outer pressure. The mold can be made for instance in such way that two of its lateral walls are adjustable by means of a dove-tail guide or the like, while the bottom and cover plates, as well as the remaining lateral walls are fixed. The adjustable lateral walls are brought nearer together during the compression, the press-jaws of a vise engaging, say, direct with the lateral walls of the mold. Although it has been already attempted to put finished, cast-on-contacts, under pressure, by shrinking on metal rings, the compression in a mold has the advantage that the pressure can be exercised already when the metal is in a semi-liquid state.

Figure 2:
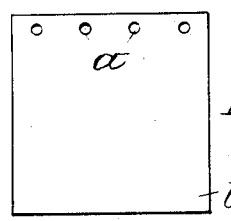
Figure 3:
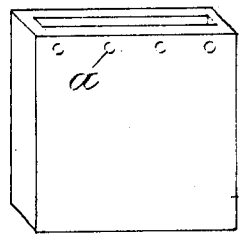
Figure 4:
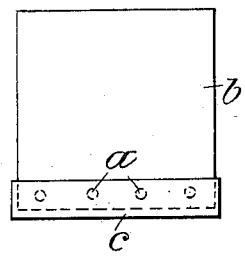
Figure 5:
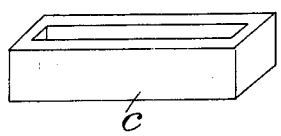
Figures 6, 7:
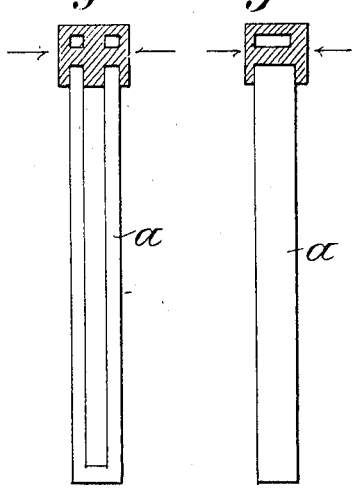

In the accompanying drawing:—Figure 1 is a cross-sectional elevation of Fig. 2. Fig. 2 is a side elevation of a hollow carbon body; Fig. 3 is a perspective view of the same; Fig. 4 is an elevation of a carbon body suspended in a mold; Fig. 5 is a perspective view of the mold; Fig. 6 is a section showing a hollow carbon body after casting; Fig. 7 is a similar view of a solid body, and Fig. 8 is a section showing a modified arrangement applied to a hollow carbon body.

The metal contact forming the subject of the invention is produced in the following manner: A hollow carbon body $b$, say of rectangular shape, is provided near its free opening with perforations $a$ passing through both its lateral walls. The carbon body is placed or suspended in a mold $c$ in the manner shown in Fig. 4, with the perforations downward. The suspension must be effected in such manner that the carbon body should not reach the bottom of the mold, but that the edge of the latter should cover the openings $a$. After the carbon, as well as the mold, has been heated in accordance with this invention, namely to a point above the melting point of the contact metal, the molten metal is poured into the mold. Lead, hard lead, aluminium etc. are specially suitable for casting. On cooling and solidifying, the metal contracts, which results in its adhering firmly to the carbon body. The metal rods produced in and between the openings $a$ exercise a strong tension. The final, complete and firm contact between the carbon body and the metal cast on, is obtained by exposing the carbon head provided with still soft, semi-liquid, warm metal to a pressure of 30 to 100 atmospheres, and if desired leaving it under that pressure until the metal has completely solidified. This pressure may be exercised on the lateral surfaces of the carbon by means of a parallel vise, a hydraulic press or the like by means of solid jaws. The pressure is still further increased in the direction of the axis of the metal rods produced in the holes $a$ (see arrows in Figs. 6 and 7) and in that way the metal is forced into the inner pores of the carbon.

The action of the process consists in the metal contact so to say melting together with the carbon body and adhering to it so that it can be removed only by melting it off. The result is that the loss of electrical pressure in the element is reduced, and that in hollow carbon bodies an air- and liquid-tight closing is obtained at the same time and that finally the efficiency of the element is indirectly increased.

Figure 8:
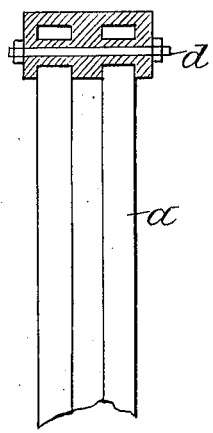

The screws $d$ shown in Fig. 8 are intended on the one hand for carrying the current from the pole into the conductor, and on the other hand, they avoid the weakening of contact which is possible in the case of some metals (for instance, lead). The perforations for these tension screws are made in such manner that the metal rods produced in the holes $a$ are perforated. Care must be taken during that operation that the drill should not touch the wall of the carbon, but pass only through the metal, as otherwise the tension screws $d$ would come into contact with the electrolyte drawn in and thus become corroded and dissolved. For that reason, the metal contact must be made of some metal resisting acids, thus for instance when chromic acid alone is used, of lead or aluminium, and when using chromic acid with an excess of sulfuric acid, of lead only.

In the case of metals with a very high melting point, the liquid metal is drawn in into the carbon. This process is more particularly suitable when making contacts of a metal that does not resist acids, or of a mixture of a metal that does, and a metal that does not, resist acids, for in that case the carbon must be impregnated through and through with the metal.

What I claim as my invention and desire to secure by Letters Patent is:—

1. A method of attaching metal contacts to carbon electrodes, consisting in heating the head portion of the electrode to a temperature above the melting point of the metal to be employed, and in impregnating said portion with molten metal, said metal being absorbed by the heated carbon.

2. A method of attaching metal contacts to carbon electrodes, consisting in heating the head-portion of the electrode to a temperature above the melting point of the metal to be employed, and in impregnating said portion with molten metal, said metal being pressed into the heated carbon while still in a semi-liquid state and under a high pressure.

3. A method of securing metal contacts to carbon electrodes consisting in providing the electrodes at the parts to which the metal contact is to be attached, with perforations, placing the perforated parts of the electrodes, in a heated state, into a mold, pouring molten metal into the mold, and subjecting the cast portion to a high pressure.

4. A method of securing metal contacts to carbon electrodes consisting in providing the electrodes, at the parts to which the metal contact is to be attached, with perforations, placing the perforated parts of the electrodes in a heated state into a mold, pouring molten metal into the mold, and subjecting the cast portion together with the mold, to a high pressure.

5. A method of securing metal contacts to carbon electrodes consisting in providing the electrodes, at the parts to which the metal contact is to be attached, with perforations, placing the perforated parts of the electrodes in a heated state, into a mold, pouring molten metal into the mold, and subjecting the cast portion together with the mold to high pressure in the longitudinal direction of said perforations.

In testimony whereof I have signed my name to this specification in the presence of two subscribing witnesses.

STEPHAN BENKÖ.

Witnesses:
 JOSEPH WIRKMANN,
 MICHAEL TÖNIÄR.